(12) United States Patent
Dakowski et al.

(10) Patent No.: US 8,858,169 B2
(45) Date of Patent: Oct. 14, 2014

(54) HIGH-PRESSURE TURBINE FOR TURBOMACHINE, ASSOCIATED GUIDE VANE SECTOR AND AIRCRAFT ENGINE

(75) Inventors: Mathieu Dakowski, Noiseau (FR); Alain Dominique Gendraud, Vernou la Celle sur Seine (FR)

(73) Assignee: SNECMA, Paris (FR)

( * ) Notice: Subject to any disclaimer, the term of this patent is extended or adjusted under 35 U.S.C. 154(b) by 781 days.

(21) Appl. No.: 13/059,350

(22) PCT Filed: Aug. 24, 2009

(86) PCT No.: PCT/EP2009/060853
§ 371 (c)(1),
(2), (4) Date: May 11, 2011

(87) PCT Pub. No.: WO2010/023172
PCT Pub. Date: Mar. 4, 2010

(65) Prior Publication Data
US 2011/0229314 A1 Sep. 22, 2011

(30) Foreign Application Priority Data
Aug. 26, 2008 (FR) ...................................... 08 55733

(51) Int. Cl.
*F01D 1/02* (2006.01)
*F01D 25/24* (2006.01)
(52) U.S. Cl.
CPC ............. *F01C 9/042* (2013.01); *F05D 2250/41* (2013.01); *F05D 2270/114* (2013.01); *Y02T 50/671* (2013.01); *F01D 25/246* (2013.01)

USPC ..................... 415/190; 415/209.2; 415/209.4; 415/210.1

(58) Field of Classification Search
USPC ........... 415/134–139, 189–190, 209.2–209.4, 415/210.1
See application file for complete search history.

(56) References Cited

U.S. PATENT DOCUMENTS 2,903,237 A * 9/1959 Everett et al. ................. 415/138
2,917,276 A * 12/1959 Klompas et al. .............. 415/189
(Continued)

FOREIGN PATENT DOCUMENTS

EP 0 513 956 A1 11/1992
EP 0 526 058 A1 2/1993
(Continued)

OTHER PUBLICATIONS

U.S. Appl. No. 13/125,154, filed Apr. 20, 2011, Dakowski, et al.
(Continued)

*Primary Examiner* — Edward Look
*Assistant Examiner* — Danielle M Christensen
(74) *Attorney, Agent, or Firm* — Oblon, Spivak, McClelland, Maier & Neustadt, L.L.P.

(57) ABSTRACT

An assembling of a guide vane assembly of a turbomachine turbine, formed by an annular row of stationary flow-stabilizing vanes. An outer edge of the guide vane assembly is axially bearing on a line of an external casing of the turbine and an inner edge of the guide vane assembly is in axial sliding connection with the line of the internal casing of the turbine, the axial sliding connection allowing the inner edge to be free along the motor axis with the axial stop being achieved by the axial bearing of the outer edge of the vane.

8 Claims, 5 Drawing Sheets

(56) References Cited

U.S. PATENT DOCUMENTS

| | | | |
|---|---|---|---|
| 3,443,791 A | | 5/1969 | Sevetz et al. |
| 3,807,891 A | | 4/1974 | McDow et al. |
| 3,843,279 A | | 10/1974 | Crossley et al. |
| 4,023,919 A | * | 5/1977 | Patterson ............ 415/134 |
| 4,379,560 A | | 4/1983 | Bakken |
| 4,384,822 A | | 5/1983 | Schweikl et al. |
| 4,856,963 A | * | 8/1989 | Klapproth et al. ............ 415/190 |
| 5,211,536 A | | 5/1993 | Ackerman et al. |
| 5,343,694 A | | 9/1994 | Toborg et al. |
| 5,398,496 A | | 3/1995 | Taylor et al. |
| 5,839,878 A | | 11/1998 | Maier |
| 6,726,446 B2 | * | 4/2004 | Arilla et al. ............ 415/138 |
| 2005/0120718 A1 | | 6/2005 | Markarian et al. |

FOREIGN PATENT DOCUMENTS

| | | |
|---|---|---|
| EP | 0 616 111 A1 | 9/1994 |
| FR | 2.189.632 | 1/1974 |
| GB | 1089660 | 11/1967 |
| GB | 2 069 064 A | 8/1981 |

OTHER PUBLICATIONS

French Preliminary Search Report issued on Feb. 20, 2009 in corresponding French Application No. 0855733.

Russian Office Action issued Jun. 11, 2013 in Patent Application No. 2011111491 with English Translation.

* cited by examiner

HIGH-PRESSURE TURBINE FOR TURBOMACHINE, ASSOCIATED GUIDE VANE SECTOR AND AIRCRAFT ENGINE

TECHNICAL FIELD

The invention relates to the assembly of a turbine guide vane assembly.

It is applicable primarily to the assembly of a guide vane assembly of a high-pressure turbine in an aircraft engine, such as a turbojet engine.

BACKGROUND OF THE INVENTION

In a turbojet engine high-pressure turbine, the guide vane assembly is currently assembled by being fastened with the bottom of the casing, also called the "line of the internal casing." Hereinafter, we will designate the line of the internal casing as being the assembly of structural elements supported or fixed directly to the internal casing of the turbine. Similarly, the expression "line of the external casing" will be used to refer to the assembly of structural elements supported or fixed directly to the outer turbine casing. Several fastening solutions have already been provided. They can be divided into essentially two categories: those commonly used requiring bolting as the means for fastening to the line of the internal casing, like that described in patent application EP 1 369 552, and that using other fastening means such as pins.

Such solutions using pins are for example described in patent applications FR 2 189 632 and EP 0 513 956.

One solution with a pin currently used by the applicant is shown in FIG. 1.

The designations "upstream" and "downstream" are used in relation to the flow of gas (from left to right in FIG. 1). Likewise, the terms "external," "outer," "internal," and "inner," "azimuthal" are used in relation to the position of the elements relative to the turbine shaft (situated at the bottom in FIG. 1). Thus an azimuthal position corresponds to an azimuth angle relative to the axis of rotation of the turbine shaft. FIG. 1 shows that the high-pressure guide vane assembly includes a sector defining a row of stationary flow-stabilizing vanes 1 placed upstream of the row of mobile vanes 2 of the high-pressure turbine. The inner edge 10 of a sector 1 is fastened to a so-called inner cone part 30 of the line of the internal casing 3 of the turbine via pins 4. This line of the internal casing 3 in particular comprises the guide vane casing 31. The outer edge 11 of a sector 1 bears axially against an annular part 50 that supports the mobile vanes 2 and that is fixed directly to the external casing 5 of the turbine. Owing to this assembly (axial bearing of the outer edge and fastening by pin of the inner edge), the stationary guide vanes 1 can, during operation of the turbine, tilt in the downstream or upstream directions, by several degrees with the aim of recovering the differential expansions likely to occur between the external casing 5 and the internal casing 3. Moreover, such an assembly makes it possible not to create excessive stresses and to guarantee sealing. During operation of the turbine, under the thrust of the gases, the stationary vanes 1 of the guide vane assembly bear axially on two zones symbolized by the ellipses, an inner zone Z1 and an outer zone Z2 with a more or less balanced distribution of the stresses. In other words, half of the thrust forces of the stationary guide vanes 1 are applied in zone Z1, the other half in zone Z2.

Thus, regardless of the fastening solution currently used to assemble the turbine guide vane assembly, and in particular that with pins used by the applicant, it is necessary to provide for sufficient dimensioning both of the line of the internal casing and the line of the external casing, to be able to react the stresses applied. Such a dimensioning must be accompanied by a given mass of the extensions of the internal and external casing, in particular the guide vane casing, which can be significant.

The aim of the invention is then to propose a solution that makes it possible to reduce the mass of the guide vane casing of a turbine, by reducing or even eliminating the forces applied on the line of the internal casing, during operation by the gas thrust.

In other words, the aim of the invention is to produce a turbine guide vane assembly making it possible to have all of the thrust forces applied on the line of the external casing and to recover the axial differential expansions likely to occur between the line of the external casing and the line of the internal casing.

BRIEF DESCRIPTION OF THE INVENTION

To that end, the invention relates to a high-pressure turbine of a turbomachine, comprising at least one guide vane assembly formed by an annular row of stationary flow-stabilizing vanes and a vaned rotor rotatingly mounted downstream of the guide vane assembly, said guide vane assembly including an outer edge and an inner edge, characterized in that the outer edge bears axially against the line of the external casing of the turbine and the inner edge is axially slidingly connected to the line of the internal casing of the turbine, the axial sliding connection allowing the inner edge to be free along the engine axis with the axial stop formed by the axial bearing of the outer edge of the vane.

The sliding axial connection sought in the context of the invention is therefore a sliding connection in the technological sense of the term, which therefore allows a degree of freedom along the axis of the engine, in other words of the turbomachine for the inner edge of the vane.

The axial stop of the vane is done by the axial bearing of the outer edge of the vane: the aim sought according to the invention is therefore achieved since, with such a sliding axial connection on the line of the internal casing, all of the thrust forces during operation of the turbomachine are applied on the line of the external casing.

In no case is the sliding axial connection defined in the context of the invention an assembly allowing a certain axial displacement, such as an assembly with an expansion joint. An assembly of the inner edge of the vane with an expansion joint is not within the scope of the invention inasmuch as it necessarily reacts part of the thrust forces of the turbomachine during operation.

The line of the external casing can comprise an annular support fixed to the external casing and against which the outer edge of the guide vanes bears.

According to one preferred embodiment,
  the line of the internal casing comprises an annular member with a plurality of axial grooves,
  each inner guide vane edge comprises extensions that extend towards the line of the internal casing and that are configured in hooks, one group of which is oriented in the upstream direction of the turbine and the other group of which is oriented in the downstream direction of the turbine, the hooks being interlocked in a pair of flanges fixed relative to each other, the axial sliding connection being done by a plurality of pins that extend radially from at least one of the flanges towards the inside of the turbine and that are housed individually in one of the axial grooves of the annular member of the line of the internal casing.

According to the preferred embodiment of the invention, a rigid high-pressure guide vane assembly crown is therefore made with a pair of annular flanges fixed relative to each other, the assembly being axially slidingly connected to the extension of the vaulted internal casing. This connection allows the assembly to be centered and axially free. The axial stop (load-bearing) is done by the axial bearing of the outer edge of the vane, in particular the downstream outer rail, on the line of the external casing.

Advantageously, the pair of flanges is fixed relative to each other by bolting.

It is preferable to provide that the portion of the upstream guide vane extensions and the upstream flanges are configured to delimit a sufficiently wide passage to provide air to the guide vane assembly from upstream.

Preferably, the flange from which the plurality of pins extends inward is the upstream flange and in which the annular member of the line of the internal casing comprising the axial grooves in which the pins are housed is a member fixed to the internal turbine casing upstream of the guide vane assembly.

When the guide vane assembly comprises at least one sector, one of the flanges can comprise a plurality of axial tabs whereof the individual width corresponds to the distance separating two hooks of a same guide vane assembly sector oriented identically, the flange tabs and the sector hooks being arranged relative to each other to make up a mortise and tenon system allowing the azimuthal positioning of the guide vanes.

The flange comprising the tabs is preferably the downstream flange.

Each flange is preferably made up of one single-piece part whereof the annular shape has a length allowing the assembly of the entire annular row of stationary vanes.

The invention also relates to a turbine guide vane sector comprising at least one stationary flow-stabilizing vane, one lateral edge of which comprises extensions configured in hooks divided into two groups oriented differently, one towards the leading edge, the other towards the trailing edge of the vane.

The turbine guide vane sector can comprise a single stationary flow-stabilizing vane.

An extension of a lateral edge can advantageously comprise a group of two hooks.

The invention also relates to an annular flange comprising hooks intended to cooperate by interlocking with one of the groups of hooks of the sector as previously described.

The annular flange can comprise pins.

The invention also relates to an aircraft engine comprising a high-pressure turbine as previously described.

The invention has the following main advantages:
the elimination of forces on the line of the internal casing,
the possible reduction of the thicknesses dimensioning the
  lines of the internal casing, in particular the guide vane
  casing, and therefore the possible reduction of the mass.

BRIEF DESCRIPTION OF THE DRAWINGS

Other advantages and features will better emerge from reading the detailed description done in reference to the following figures, in which.

DETAILED DESCRIPTION OF THE INVENTION

Figure 1:
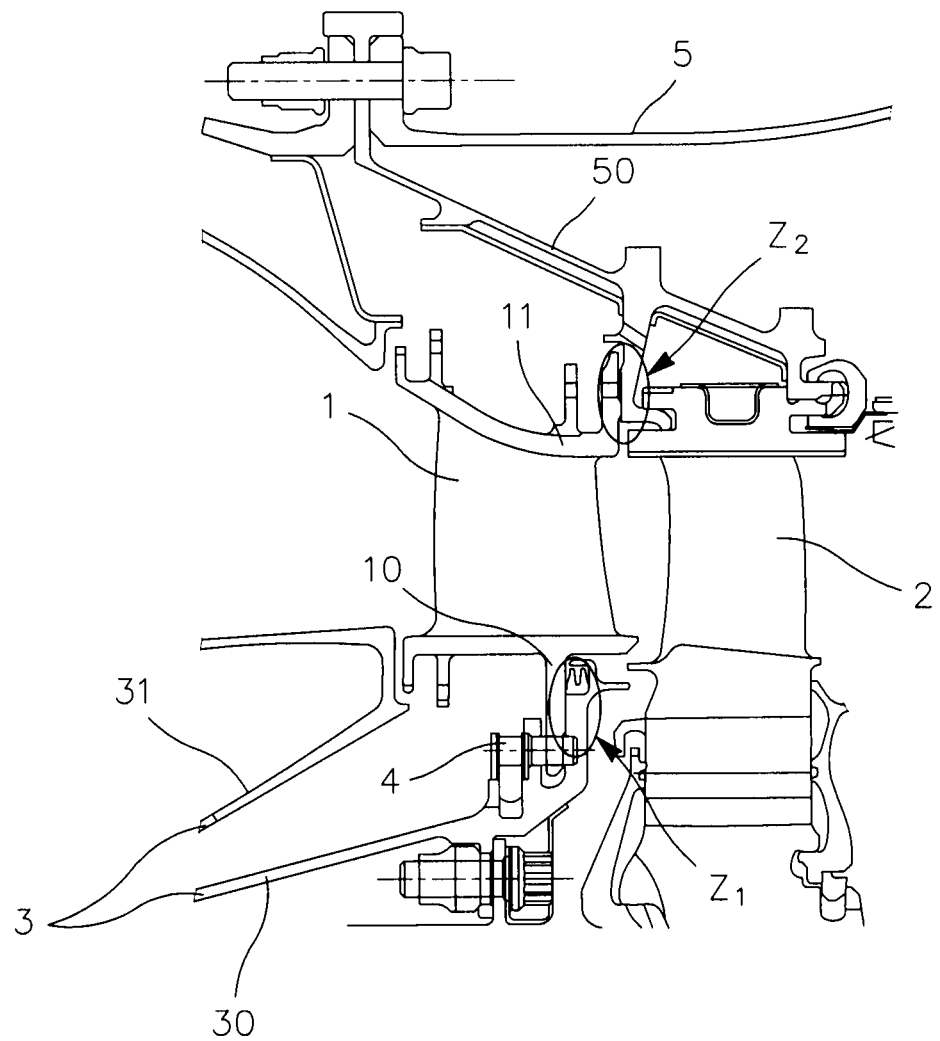
FIG. 1 is a partial longitudinal cross-sectional view of a turbojet engine high-pressure turbine according to the state of the art.

A high-pressure turbine according to the state of the art, as shown in FIG. 1, was described above. The drawback of the assembly of such a turbine is to define an equal distribution of the thrust forces from the gases between zone Z1 and zone Z2. It is therefore necessary to provide a line of the internal casing 3, in particular for a guide vane casing 31, dimensioned sufficiently to receive the thrust forces in zone Z1.

The aim of the invention is to make all of the axial forces go from the guide vane assembly HP 1 through the line of the external casing 5, or in zone Z2.

Figure 2:
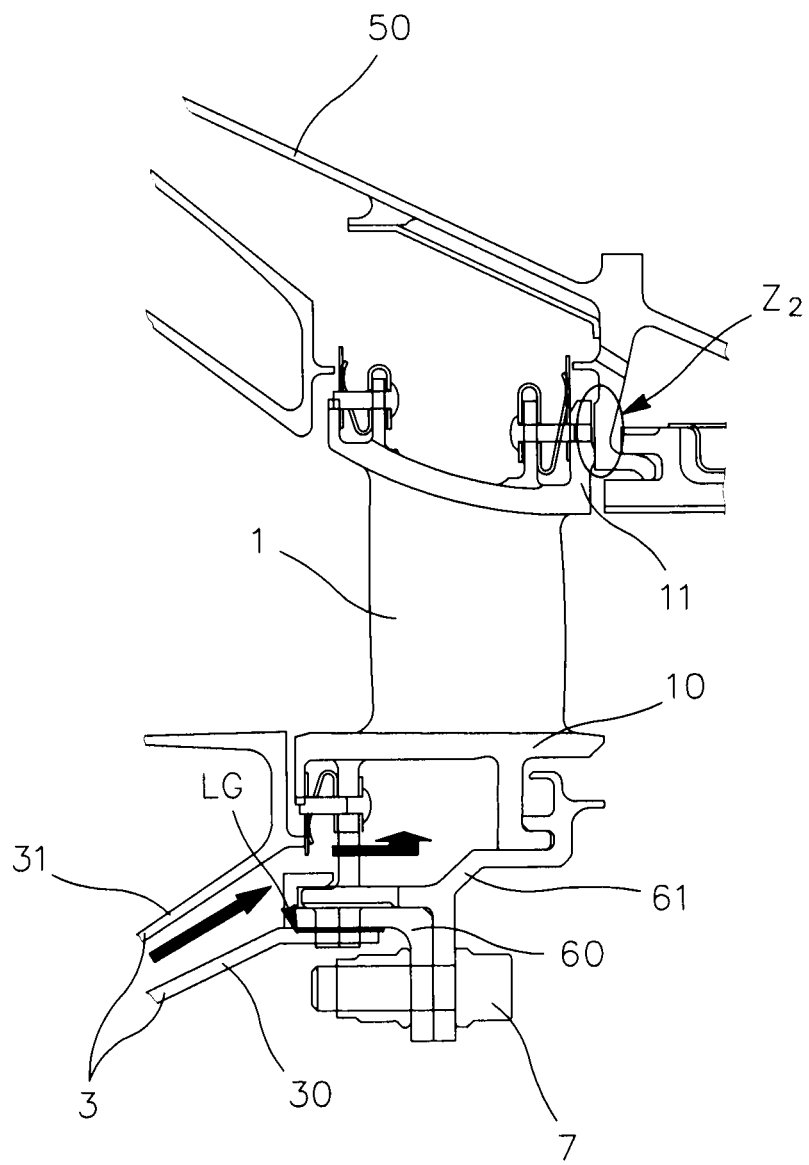
FIG. 2 is a partial longitudinal cross-sectional view of an embodiment of a high-pressure turbine according to the invention.

To that end, it is provided to produce an axial sliding connection in zone Z1 (symbolized by a black horizontal line LG in FIG. 2). In the illustrated embodiment, the axial sliding connection is done owing to a rigid annular crown formed by an upstream flange 60, a downstream flange 61 and at least one guide vane sector 1 hooked to the flanges 60, 61. The rigid crown thus formed is locked by a system with a screw 7 and a nut 8.

Figure 3A:
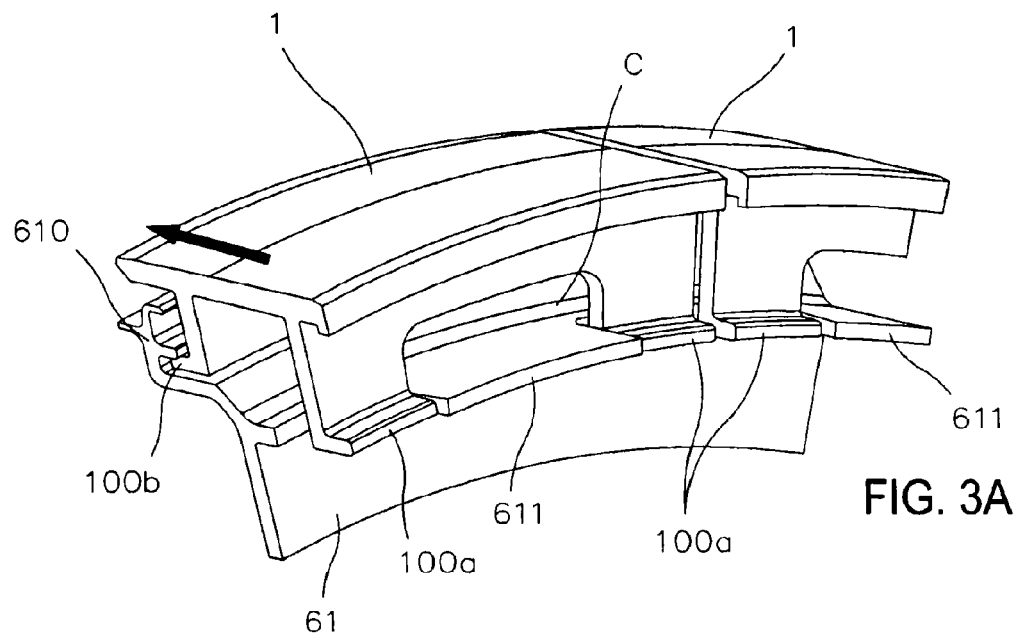
FIGS. 3A to 3E show the different successive steps of assembling the guide vanes of a high-pressure turbine according to the invention.
Figure 3B:
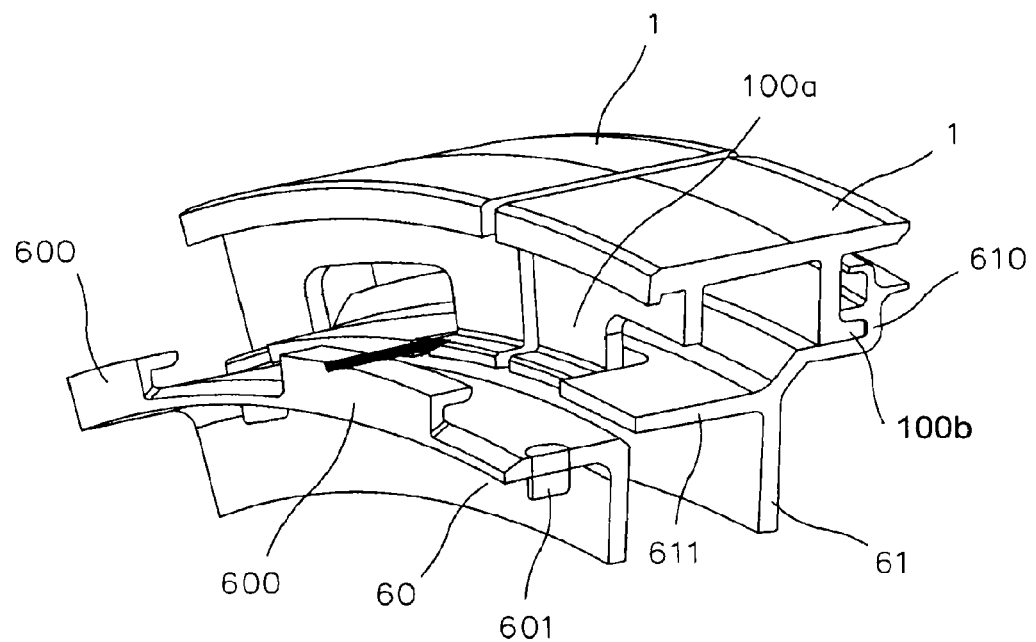
Figure 3C:
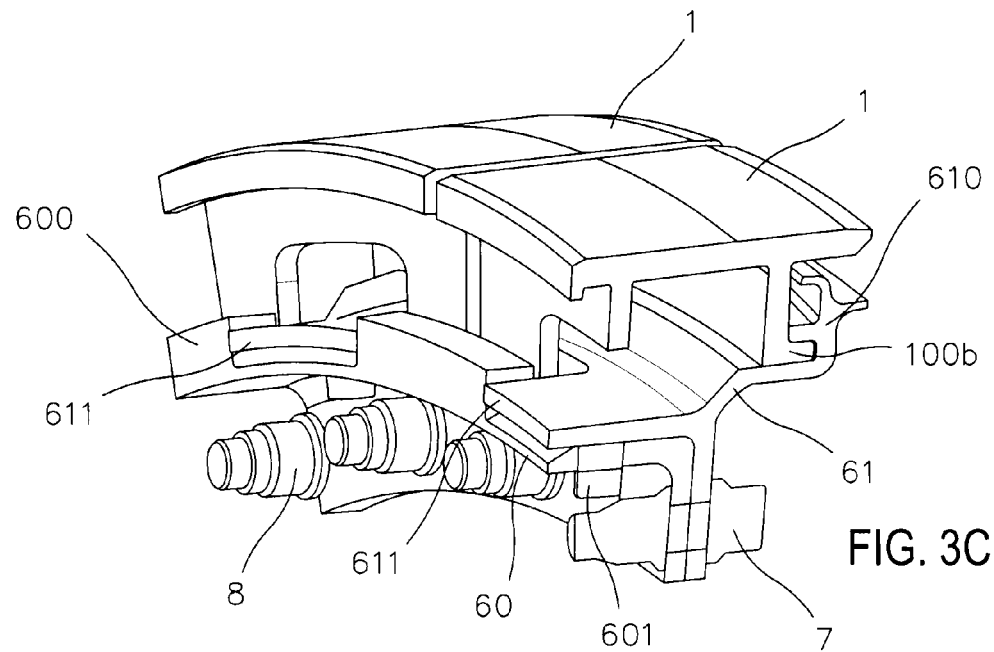
Figure 3D:
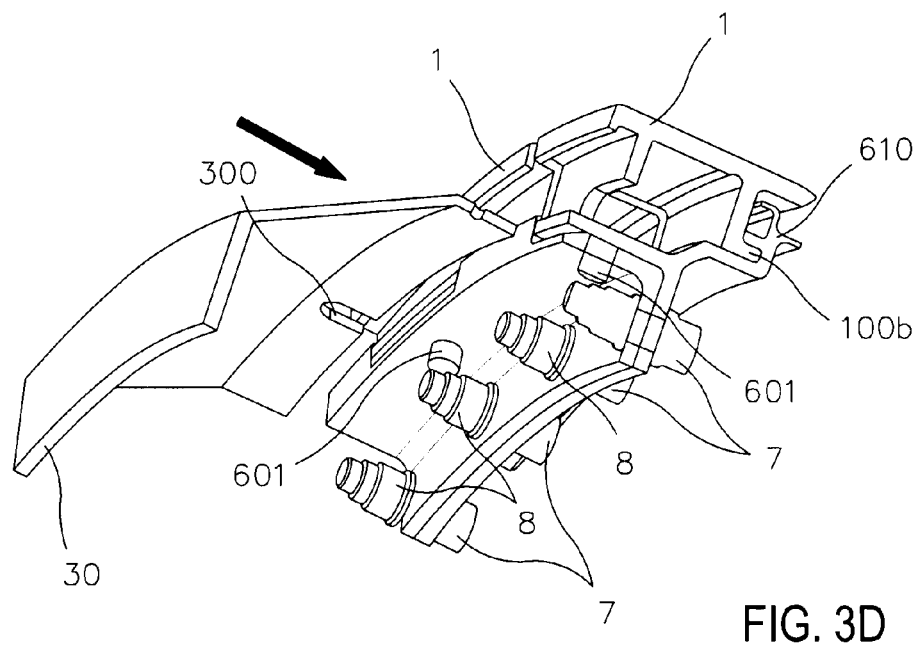

More precisely, the line of the internal casing 3 comprises an inner cone 30 with a plurality of axial grooves 300 (FIG. 3D).

Each inner edge 10 of the guide vane sector(s) 1 comprises extensions 100 that extend towards the line of the internal casing 3 and that are configured in hooks whereof one group 100a is oriented towards the upstream direction of the turbine and the other group 100b of which is oriented towards the downstream direction of the turbine. The hooks 110a, 110b are interlocked in the hooks with complementary shapes 600, 610 of the pair of flanges 60, 61. The latter parts 60, 61 are fixed to each other by the screw/nut system 7, 8.

The axial sliding connection LG is achieved by a plurality of anti-rotation pins 601 that extend radially from the upstream flange towards the inside of the turbine (FIGS. 2 and 3B) and which are individually housed in one of the axial grooves 300 of the inner cone 30 of the line of the internal casing 3.

The crown thus defined has an interface with the inner cone 30 in continuation of the extension of the vaulted internal casing 3. This connection has several functions: a centering function, an axial sliding function, and an anti-rotation function.

The sliding function of the connection allows the rigid crown to have freedom along the engine axis. The rigid crown, under the force of the guide vane assemblies HP, comes only into contact on the line of the external casing 5 (at the downstream outer rail DHP 11; zone Z2) without creating axial forces on the inner cone 30. In other words, the forces are transmitted by the external casing 5.

The hooks 100a, 600 of the upstream inner edge 100a of the DHP sector and the upstream flange 60, respectively, are designed to perform the following functions:
  supply of air for the sectors 1 of the guide vane assembly
    DHP by delimiting an air passage C provided to that end
    (FIGS. 3B, 3C),
  azimuth positioning of the sectors 1 of the guide vane
    assembly DHP.

More precisely, to achieve the azimuthal positioning of the sectors 1, the downstream flange 61 comprises a plurality of axial tabs 611 whereof the individual width corresponds to the distance separating two hooks 100a of a same guide vane sector oriented identically. The tabs 611 of the flange 61 and the sector hooks 600 are arranged relative to each other to form a mortise and tenon system enabling the azimuthal positioning of the guide vane sector(s) (FIG. 3A).

Figure 3E:
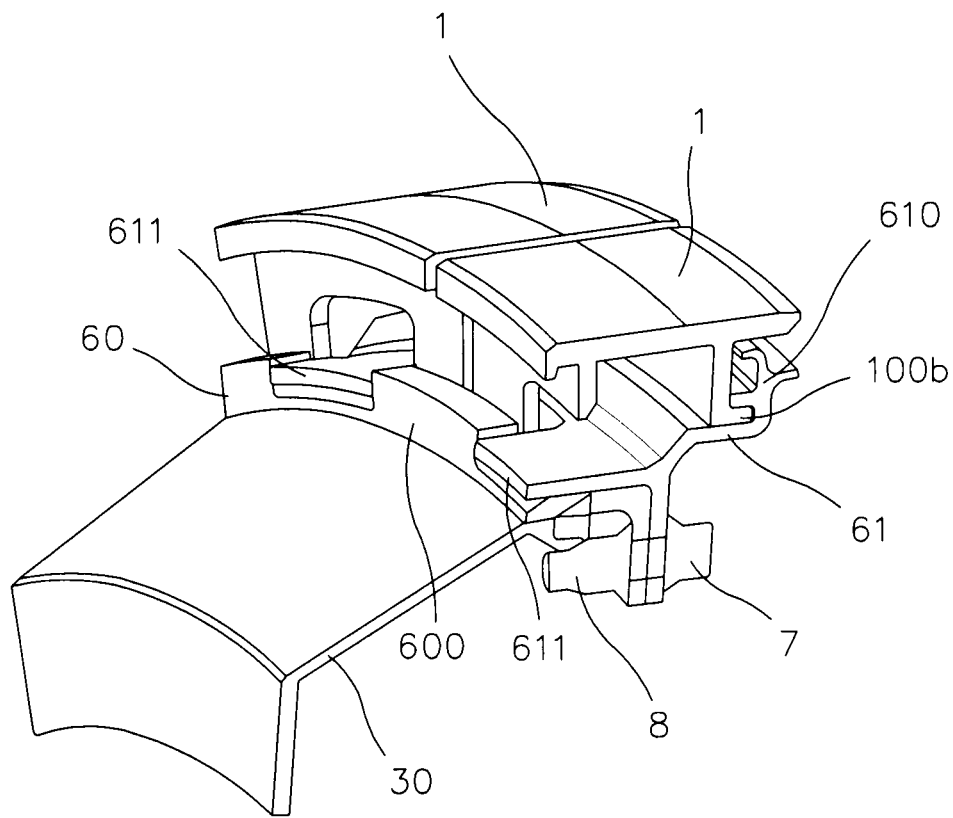

To achieve the assembly of the guide vane assembly, one proceeds as follows (the direction of the actions being referenced by an arrow in FIGS. 3A to 3D):

- placement of the guide vane sectors 1 in the downstream flange 61 by complementary interlocking of the hooks 100b and the hooks 610 of the downstream flange 61 (FIG. 3A),
- assembly of the upstream flange 60 in the subassembly formed by the downstream flange 61 and the sectors 1 by complementary interlocking of the hooks 100a and the hooks 600 of the upstream flange (FIG. 3B),
- screwing the rigid crown thus formed by bolting 7, 8, each bolt being made up of a screw 7 and a bolt 8 (FIG. 3C),
- assembling the screwed crown with the inner cone 30 of the line of the internal casing 3 by introducing each of the pins 601 into one of the corresponding axial grooves 300 formed in the inner cone (FIG. 3D),
- fastening the inner cone 30 mounted in axial sliding connection LG with the crown, with the line of the internal casing 3, in order to finalize the assembly (FIG. 3E).

It goes without saying that a number of improvements or alternatives can be provided without going beyond the scope of the invention.

For example, although in the illustrated embodiment, each sector 1 comprises a single stationary vane, the invention can also be realized with sectors individually comprising several stationary vanes.

The invention claimed is:

1. A high-pressure turbine of a turbomachine, comprising:
   at least one guide vane assembly formed by an annular row of stationary flow-stabilizing vanes and a vaned rotor rotatingly mounted downstream of the guide vane assembly, the guide vane assembly including an outer edge and an inner edge;
   wherein the outer edge bears axially against a line of an external casing of the turbine and the inner edge is in axial sliding connection with a line of an internal casing of the turbine, the axial sliding connection allowing the inner edge to be free along the engine axis with an axial stop formed by an axial bearing of the outer edge of the vane,
   wherein the line of the internal casing comprises an annular member including a plurality of axial grooves, and
   wherein each inner guide vane edge comprises extensions that extend towards the line of the internal casing and that are configured in hooks, one group of which is oriented in the upstream direction of the turbine and the other group of which is oriented in the downstream direction of the turbine, the hooks being interlocked in a pair of flanges fixed relative to each other, the axial sliding connection including a plurality of pins that extend radially from at least one of the flanges towards the inside of the turbine and that are housed individually in one of the axial grooves of the annular member of the line of the internal casing.

2. The high-pressure turbine according to claim 1, wherein the pair of flanges are fixed relative to each other by bolting.

3. The high-pressure turbine according to claim 2, wherein each flange includes one single-piece part whereof the annular shape has a length allowing assembly of an entire annular row of stationary vanes.

4. The high-pressure turbine according to claim 1, wherein a portion of the upstream guide vane extensions and the upstream flanges are configured to delimit a sufficiently wide passage to provide air to the guide vane assembly from upstream.

5. The high-pressure turbine according to claim 1, wherein the flange from which the plurality of pins extend inward is an upstream flange and in which the annular member of the line of the internal casing comprising the axial grooves in which the pins are housed is a member fixed to the internal turbine casing upstream of the guide vane assembly.

6. The high-pressure turbine according to claim 1, wherein the guide vane assembly comprises at least one sector, and one of the flanges comprises a plurality of axial tabs whereof an individual width corresponds to a distance separating two hooks of a same guide vane assembly sector oriented identically, the flange tabs and the sector hooks being arranged relative to each other to form a mortise and tenon system allowing azimuthal positioning of the guide vanes.

7. The high-pressure turbine according to claim 6, wherein the flange comprising the tabs is a downstream flange.

8. An aircraft engine comprising a high-pressure turbine according to claim 1.

* * * * *